(No Model.)
C. DICKENSON.
Fruit Drier.
No. 237,098. Patented Feb. 1, 1881.
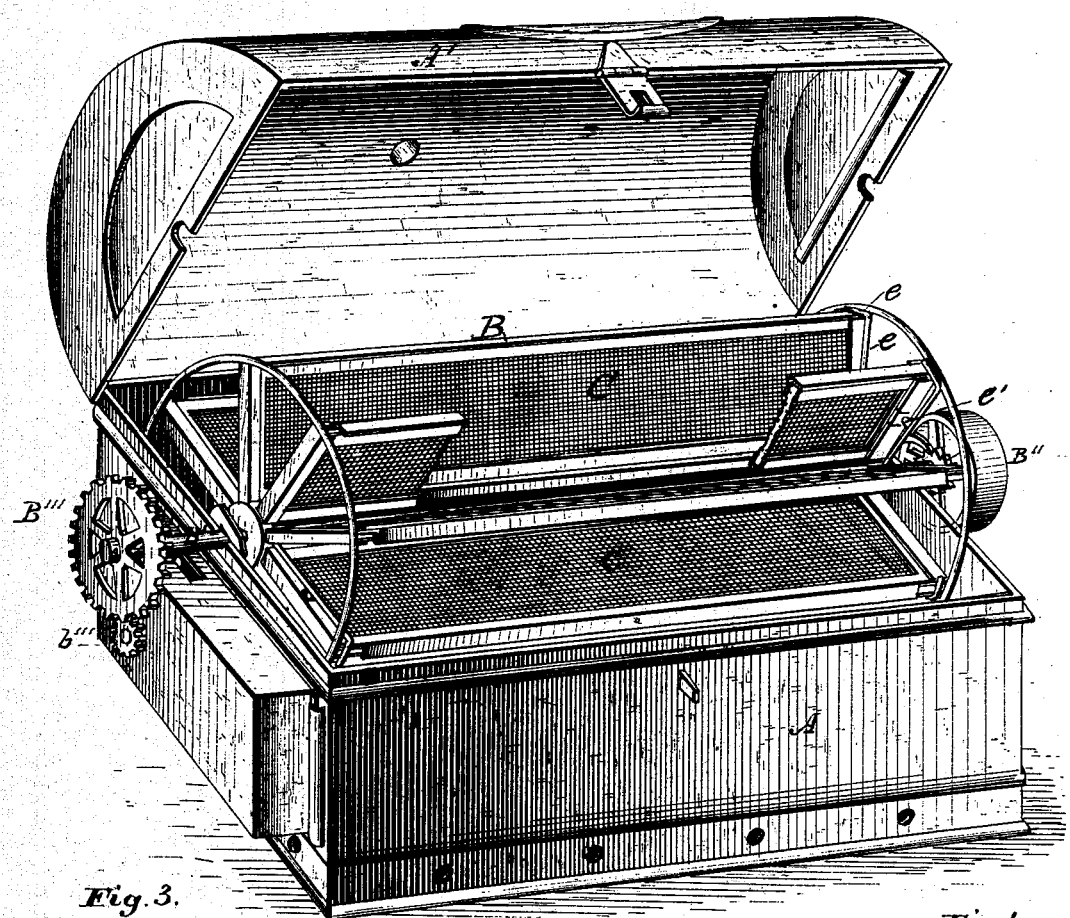
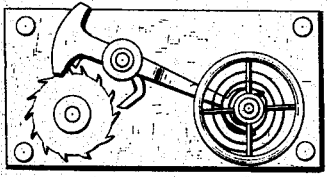
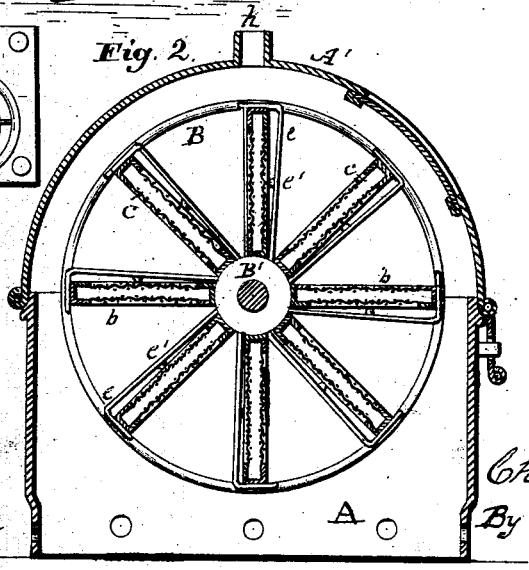
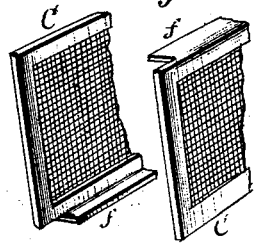

UNITED STATES PATENT OFFICE.

CHARLES DICKENSON, OF PORTLAND, OREGON.

FRUIT-DRIER.

SPECIFICATION forming part of Letters Patent No. 237,098, dated February 1, 1881.

Application filed June 1, 1880. (No model.)

*To all whom it may concern:*

Be it known that I, CHARLES DICKENSON, of Portland, Oregon, have invented a new and useful Fruit and Vegetable Drying Apparatus, of which the following is a specification.

My invention relates to an improved fruit and vegetable drying apparatus; and it consists, essentially, in a box containing a revolving frame which I call a "reel," carrying a number of double removable shelves composed of wire-netting, adapted to receive and hold the fruit or other articles to be dried clamped between them, and said reel being revolved by clock-work, and the box being adapted to be set upon a cooking-stove or other heated surface, or to be heated by a fire underneath it.

In the accompanying drawings, Figure 1 is a perspective view of the apparatus with the lid of the box raised to a vertical position, showing one of the shelves partially cut away, more clearly to exhibit the construction. Fig. 2 is a cross-section through the central portion of the box. Fig. 3 is a detached view of the clock-work escapement; and Fig. 4 represents one end of each of a pair of leaves of wire-netting, composing a double shelf when put together, to clamp and hold the fruit.

A is the box, which may be made of tin or other sheet metal. A' is the semicircular lid hinged thereto. B is the reel; B', the shaft on which it revolves, on one end of which is a drum, B'', containing a volute driving-spring and a toothed pinion engaging with a pawl pivoted to the end of the box. On the other end of said shaft is a gear-wheel, B''', engaging with the lever-escapement clock mechanism, as shown in Fig. 3. The double wire-netting shelves C C are fitted into grooves c c in the radial arms b b, and these grooves are made wide enough to allow the two leaves C C of the wire-netting shelves to have some play therein, so that they will adjust themselves to the size of the fruit contained between them. Each radial arm is provided with a spring, e, having a projecting stud, e', to press against the frame of one of the wire-netting leaves to keep it properly adjusted to its fellow as the fruit shrinks in drying. Each leaf of the double wire-netting shelves has a projecting lip, f, to lap over the adjacent edge of its fellow, as shown in Fig. 4.

To charge the apparatus, the double shelves are withdrawn from the reel and separated. The fruits or vegetables to be dried are then spread upon one of said leaves C, and its fellow applied thereto, so as to hold the fruits clamped between them. Said leaves C should then be secured together at one or more points in their central portions by bits of twine passing through the meshes of both and tied in loops, or by suitable metal clasps. The double shelves, thus charged, are then inserted in the reel, the lid of the box is closed down, the clock-work is set in motion, and heat is applied to effect the drying.

For domestic use, I adapt the box to be set upon a cooking-stove, where it will require no attention until the process of drying is completed. In this case the box may be made with or without a sheet-metal bottom.

For drying fruits or vegetables on a larger scale the box may be adapted to sit over any suitable furnace.

The constant revolving of the fruit-bearing shelves tends to prevent the juices from dripping, and to secure perfect equality in the drying.

There should be a vent-hole, h, in the lid for the escape of steam, and the lid may be provided with mica windows, if desired.

In the drawings I have shown the reel adapted to receive eight double shelves. It is manifest, however, that the number of shelves may be increased in proportion to the size of the reel. For instance, in a reel fifteen inches in diameter I can insert twelve double shelves, and in a reel eighteen inches in diameter I can insert sixteen double shelves.

Some kinds of fruit will require a more rapid revolution of the reel than others. A change in the speed may be effected by removing the gear-wheels B''' and b''' and substituting others of different relative diameters, for which purpose I contemplate providing each machine with two sets of said wheels.

To dry grapes in clusters, the clusters may be secured to the wire-netting shelves by means of twine passing through the meshes. In this case one leaf only of the shelves need be inserted; or, instead of the wire-netting shelves, any suitable frames adapted to fit into the grooves of the radial arms b, to which to secure the clusters, may be substituted. To facilitate this change, I so construct the reel that it may readily be slipped off the shaft B' and a different reel or frame, suitable for carrying grapes in clusters, slipped on; or, instead of removing the reel from said shaft, the wire-netting shelves only may be removed and other suitable frames for carrying grapes in clusters may be inserted in the grooves of the radial arms.

What I claim as my invention is—

1. The combination of the box A and the reel B with double wire-netting shelves, constructed and adapted to clamp the fruit, and to automatically adjust themselves to the shrinking of the fruit by means of springs $e$, and rotated by clock-work, substantially as shown and described.

2. The combination of the box A with the revolving reel B, carrying the double wire-netting shelves C, constructed and adapted to clamp the fruit, and to automatically adjust themselves to the shrinking of the fruit, by means substantially as set forth.

CHARLES DICKENSON.

Witnesses:
VINTON COOMBS,
J. A. RUTHERFORD.